United States Patent
Kroman et al.

(10) Patent No.: US 7,882,181 B2
(45) Date of Patent: Feb. 1, 2011

(54) MINIMIZING DATA TRANSFER FROM POP3 SERVERS

(75) Inventors: Paul K. Kroman, Redmond, WA (US); Owen W. Lloyd, Bothell, WA (US); William S. Stauber, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 940 days.

(21) Appl. No.: 11/144,872

(22) Filed: Jun. 3, 2005

(65) Prior Publication Data

US 2006/0277257 A1   Dec. 7, 2006

(51) Int. Cl.
G06F 15/16   (2006.01)

(52) U.S. Cl. ..................................... 709/206

(58) Field of Classification Search .................. None
See application file for complete search history.

(56) References Cited

U.S. PATENT DOCUMENTS

| | | | | |
|---|---|---|---|---|
| 5,754,778 A * | 5/1998 | Shoujima | ..................... | 709/206 |
| 6,101,531 A * | 8/2000 | Eggleston et al. | ........... | 709/206 |
| 6,167,402 A * | 12/2000 | Yeager | ......................... | 707/10 |
| 6,199,103 B1 * | 3/2001 | Sakaguchi et al. | .......... | 709/206 |
| 6,363,411 B1 * | 3/2002 | Dugan et al. | ................. | 709/202 |
| 6,363,412 B1 * | 3/2002 | Niwa et al. | .................. | 709/203 |
| 6,662,230 B1 * | 12/2003 | Eichstaedt et al. | .......... | 709/229 |
| 6,859,463 B1 * | 2/2005 | Mayor et al. | ................. | 370/445 |
| 6,920,110 B2 * | 7/2005 | Roberts et al. | .............. | 370/235 |
| 6,947,396 B1 * | 9/2005 | Salmi | ......................... | 370/310 |
| 7,313,234 B2 * | 12/2007 | Takagaki et al. | .............. | 380/28 |
| 2003/0037116 A1 * | 2/2003 | Nolan et al. | ................. | 709/206 |
| 2003/0055844 A1 * | 3/2003 | Rudd et al. | .................. | 707/200 |
| 2003/0103515 A1 * | 6/2003 | Brown et al. | ................. | 370/412 |
| 2004/0199592 A1 * | 10/2004 | Gould et al. | ................. | 709/206 |
| 2004/0249892 A1 * | 12/2004 | Barriga et al. | ............... | 709/206 |
| 2005/0008011 A1 * | 1/2005 | Georgiou et al. | ............ | 370/389 |
| 2005/0193069 A1 * | 9/2005 | Brown et al. | ................. | 709/206 |
| 2005/0204001 A1 * | 9/2005 | Stein et al. | ................... | 709/206 |
| 2006/0168061 A1 * | 7/2006 | Enatsu et al. | ............... | 709/206 |
| 2008/0109518 A1 * | 5/2008 | Wilson et al. | ............... | 709/206 |

* cited by examiner

*Primary Examiner*—Rupal D Dharia
*Assistant Examiner*—Loi Tran
(74) *Attorney, Agent, or Firm*—Woodcock Washburn LLP

(57) ABSTRACT

Systems and methods are disclosed that facilitate minimizing data transfer from a post office protocol (POP) server to a client device by employing a date filter with a predefined date range and applying a message body size threshold above which only a message header will be downloaded to conserve bandwidth and/or memory space on the client device. A user can request download of a message for which only a message header was originally downloaded if the header comprises information of interest to the user.

17 Claims, 11 Drawing Sheets

MINIMIZING DATA TRANSFER FROM POP3 SERVERS

BACKGROUND OF THE INVENTION

Computers and computer-based devices have become a necessary tool for many applications throughout the world. Typewriters and slide rules have become obsolete in light of keyboards coupled with sophisticated word-processing applications and calculators that include advanced mathematical functions/capabilities. Moreover, computers that were once used solely for analyzing data have, over time, been transformed into multi-functional, multi-purpose machines utilized for contexts ranging from business applications to multi-media entertainment. Costs of such computing mechanisms have also trended downward, rendering personal computers ubiquitous throughout many portions of the world.

As computing devices have continued to develop and their use have become more widespread, peripherals associated with such devices have also become commonplace. For instance, typical computing devices include a plurality of ports (e.g., wired or wireless) into which peripherals can be attached and utilized in connection with the aforementioned computing devices. More particularly, attachable peripherals can include printers, keyboards, portable music/video players and recorders, cameras, video cards, speaker systems, personal digital assistants (PDAs), portable telephones, smart phones, or any other suitable computer peripheral. These devices can be physically coupled to a computing device by way of ports (e.g., USB ports, printer ports, . . . ), or can be communicatively coupled over a wireless link. This interaction of peripherals with computing devices has rendered such computing devices even more valuable in terms of user efficiency. Additionally, in the case of memory (resident or peripheral), finite storage limitations must be considered when allocating memory resource.

As computing devices become smaller, it can be desirable to maximize the efficiency with which memory space is allocated. Additionally, as file size and/or complexity increases due to advances in email technology, allocated memory for email downloads can be quickly consumed. Post-office protocol 3 (POP3) is a standard protocol for receiving email, by which email is stored in a message server until a user download, upon which event a downloaded email is deleted from the server or saved for a predetermined amount of time. Conventional POP3 server systems require a user to download a significant portion of email data that is ultimately discarded, thereby wasting valuable memory space on a client device. Thus, there exists a need in the art for systems and/or methodologies that overcome the aforementioned deficiencies of such email servers.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention disclosed and claimed herein, according to an aspect thereof, comprises a method of minimizing data transfer from a post office protocol (POP) server, such as a POP3 server. A date filter can be employed to filter messages to be downloaded to a client device according to whether or not such messages were delivered to the server within a predefined date range employed by the date filter. Messages excluded by the date filter can be downloaded with headers only to minimize bandwidth and storage requirements. In order to mitigate unnecessary download upon a user request to retrieve more than just the message header, an optimization algorithm can be employed to determine a size of a full or partial message body relative to the message header for the message, as well as elapsed time since a last message download session, to determine whether or not to include the message body portion with the header during download.

In another aspect, a system is disclosed that comprises a date filter and an analysis component that measures a size of a message header (e.g., in bytes), and determines a message body size threshold beyond which only the message header will be downloaded to conserve bandwidth and/or memory space on a client device to which the header is downloaded. The threshold value can be a predetermined multiple of the header size, or can be dynamically determined based in part on a time since a last download request. For instance, a longer time period since a last download increases a probability that there will be messages excluded by the date filter, thus permitting a smaller threshold value to be tolerated. Conversely, a shorter time period since a most recent previous download can increase a probability that there will be a high number of messages included by the date filters, permitting a higher threshold value to be tolerated and/or implemented.

According to a related aspect, a threshold calculation component can provide a comparison of predicted amounts of wasted bytes downloaded by employing each of a header-only protocol and a header-plus-partial message protocol, and can resolve the predicted waste values to determine an optimum threshold size value that minimizes extraneous download of information from a POP3 server to a client device to conserve resources.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
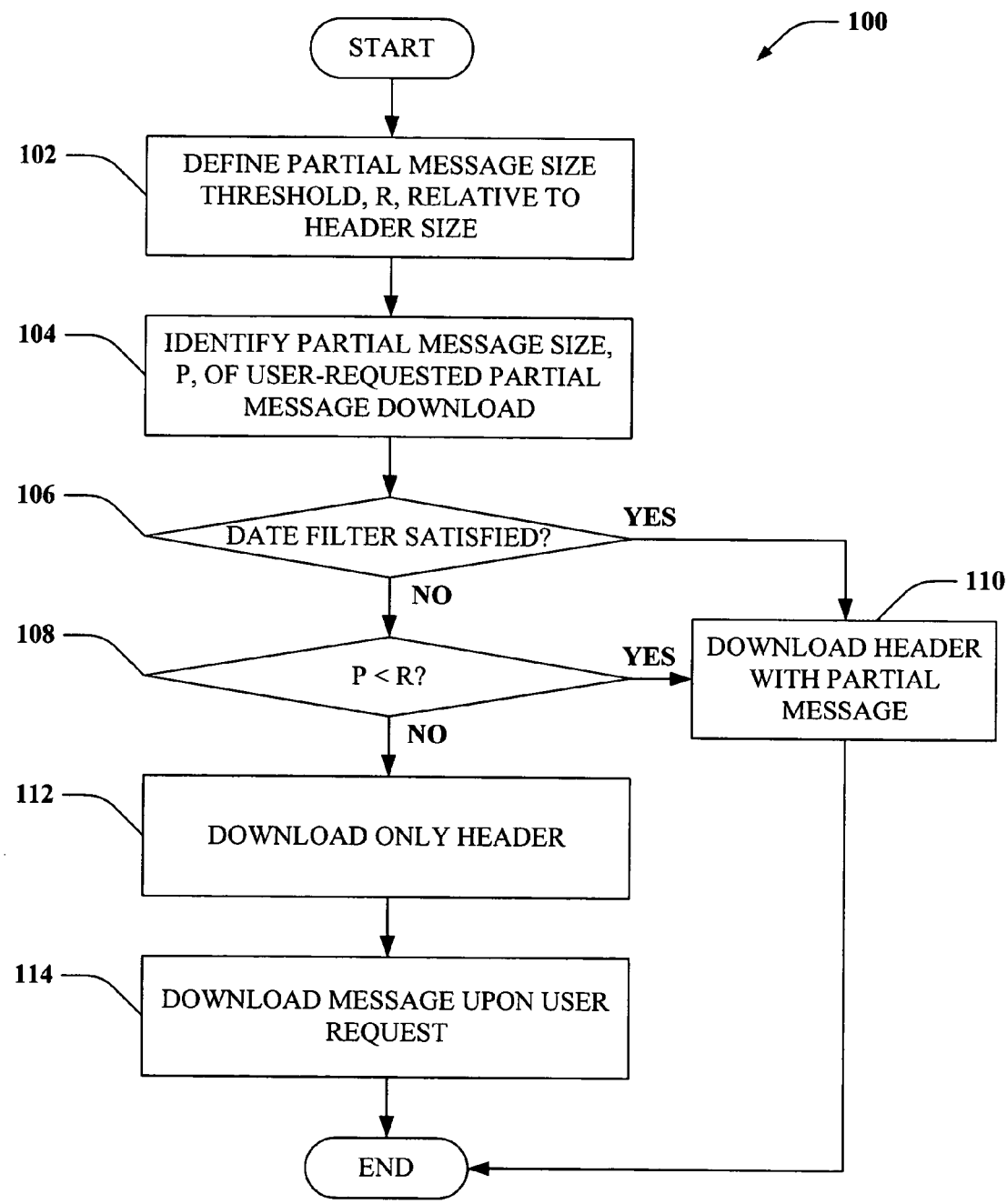
FIG. 1 is an illustration of a methodology for minimizing data transferred from a POP email server by employing a date filter to make a determination of whether to download a portion of an email message or only an email header to a client.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention can be practiced without these specific details. In other instances, well-known structures and devices are shown in block diagram form in order to facilitate describing the subject invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The subject invention relates to minimizing an amount of data transferred from a post office protocol (POP) email server when date filtering is employed by a client. Mobile devices typically have limited storage capacity. When storing e-mail on such a device, it can be desirable to store only recent e-mail messages in order to mitigate memory consumption. An e-mail client can have an option to store and display e-mail that is dated within the past X days, where X is an integer. In addition, it can be desirable to download only a portion of an email so that unusually large e-mail messages do not consume all of the available storage capacity. An e-mail client can have an option to store and display only the first Y lines or Z bytes of a message, where Y and Z are integers.

Network bandwidth to a mobile device can also often be limited and can incur a financial cost (to the user or network operator or both). Conventional POP protocols do not provide for filtering email messages according to date information.

In contrast to conventional systems, when downloading new email from a POP server, aspects described herein permit a client to select to download from the server only the email messages that are dated within a specified date range (and that have not already been downloaded to the client). The client can also limit the size of each downloaded message to satisfy any restrictions placed on the storage size of new email messages. Thus, an aspect of the invention provides for an algorithm that facilitates determining a most efficient method for downloading email from a POP server when date filtering is employed.

Figure 2:
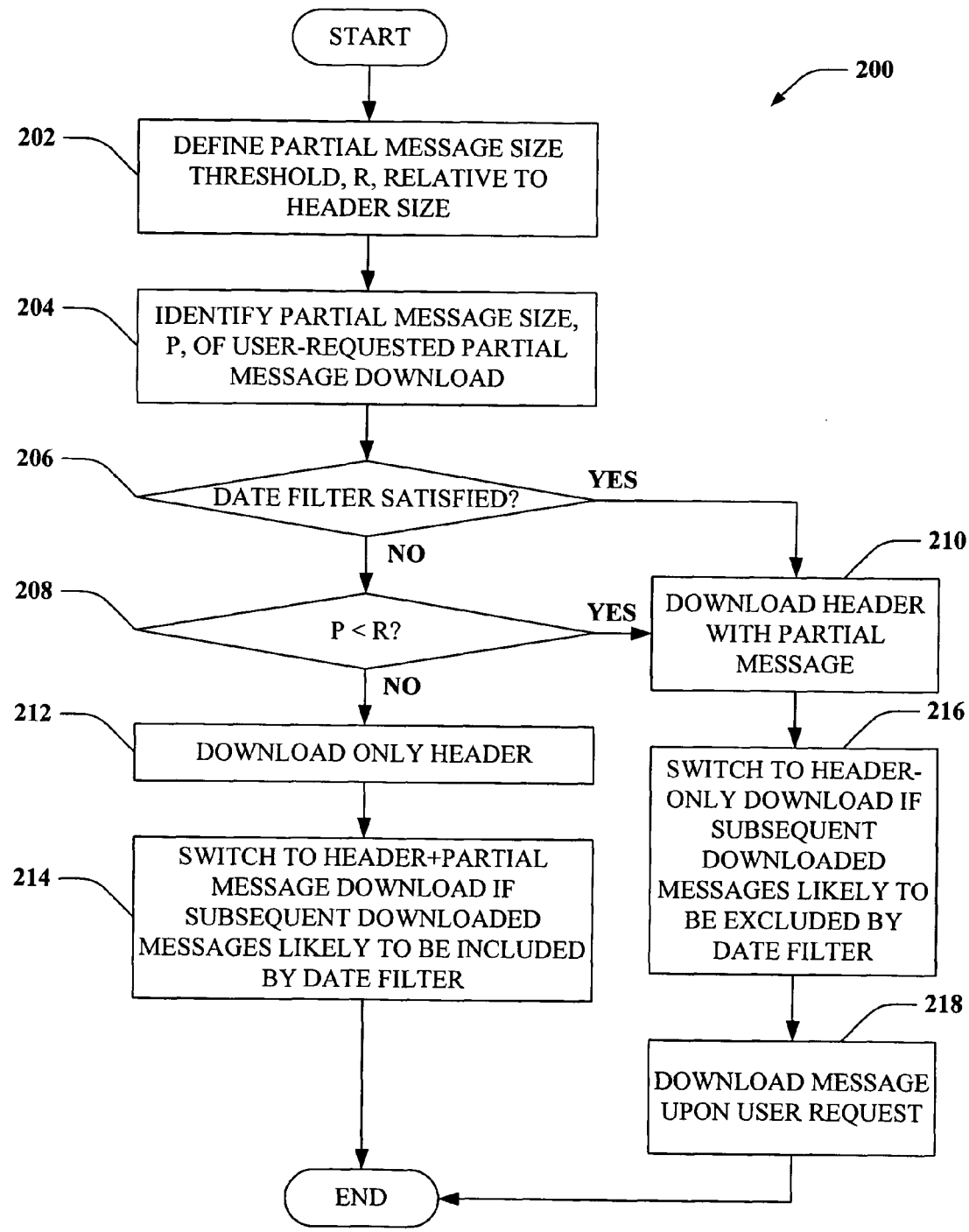
FIG. 2 illustrates a methodology for minimizing data transferred from a POP email server by employing a date filter to make a determination of whether to download a portion of an email message or only an email header to a client and permitting dynamic switching between download schemes upon detection of a boundary related to date filter inclusion.
Figure 3:
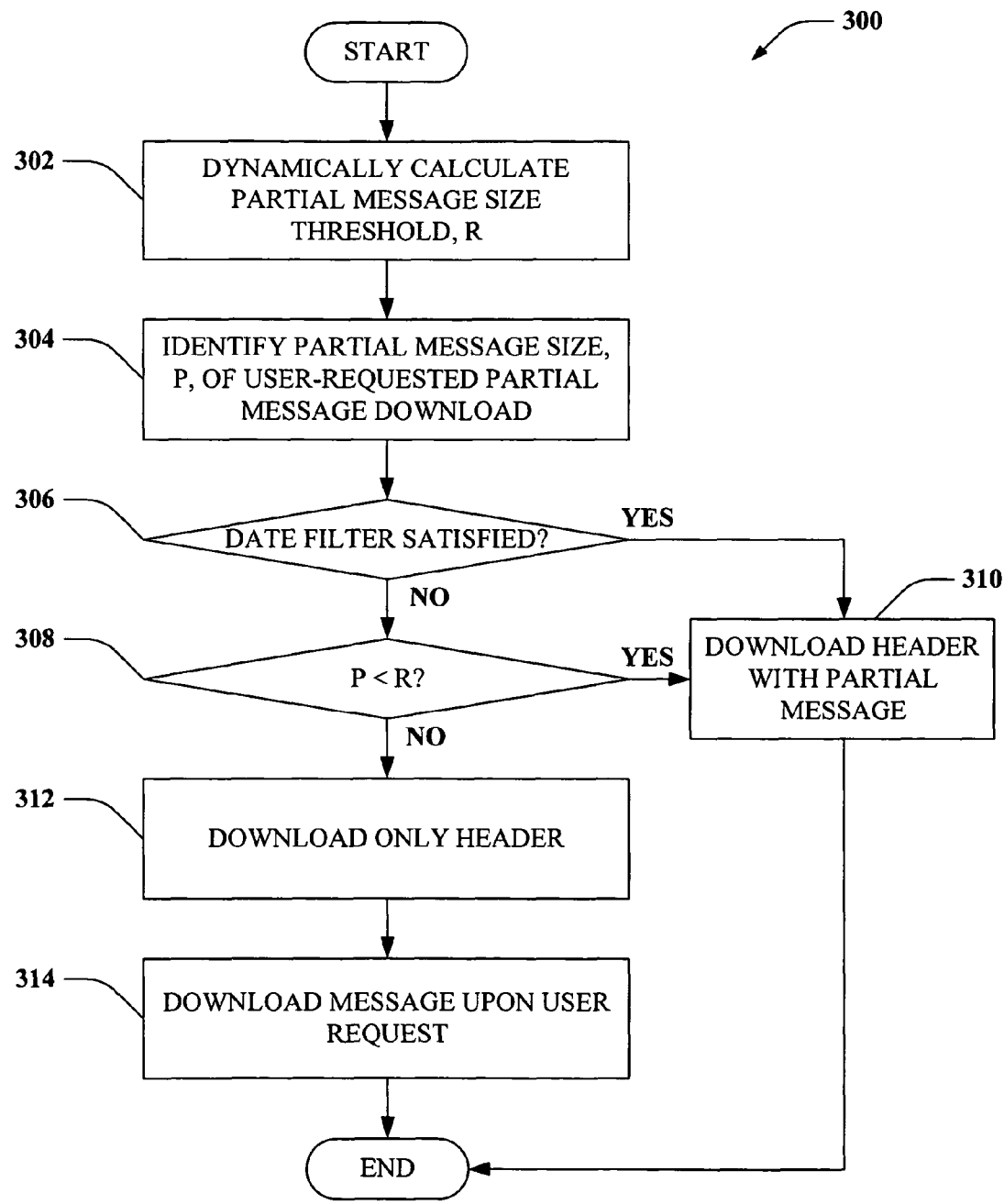
FIG. 3 illustrates a methodology for mitigating bandwidth and/or memory consumption by a mobile device when downloading email from a POP email server wherein a partial email message download size threshold is dynamically calculated based in part on an amount of time since a last download request.

With reference to FIGS. 1-3, there are illustrated flowcharts in accordance with aspects of the subject invention. While, for purposes of simplicity of explanation, the one or more methodologies shown herein, e.g., in the form of a flow chart, are shown and described as a series of acts, it is to be understood and appreciated that the subject invention is not limited by the order of acts, as some acts can, in accordance with the subject invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

FIG. 1 is an illustration of a methodology 100 for minimizing data transferred from a POP email server by employing a date filter to make a determination of whether to download a portion of an email message or only an email header to a client. When downloading an email from a POP server, a client device can download the email header only, the email header and part of the message body (e.g., a finite but variable number of lines following the header), and/or the header and the entire message body. Such downloading options generally correspond to a user option to store email data on a mobile device (e.g., a cellular phone, a laptop, a PDA, a smartphone, . . . ) in one of three manners. For example, a user can store the header only, the header and part of the message body, and/or the header and the entire message body. When a date filter is employed and the user requests more than just a message header to be downloaded and stored on the mobile device, there exists potential for memory to be needlessly occupied as well as bandwidth to be wasted during download because the message can ultimately be excluded by the date filter. That is, a user who downloads a message prior to subjecting the message to the scrutiny of the date filter risks occupying system resources that need not be occupied. For instance, if a client that downloads a header and a portion of a message body associated therewith, and if the message is excluded by the date filter, then the client has unnecessarily downloaded and stored the portion of the message body when only the header was required to determine whether the message should be excluded (e.g., the header can comprise a date field that can be employed to determine whether the message is within a date range specified by the date filter). The methodology 100 is provided to address such a situation to mitigate unnecessary data download and/or storage, and provides an algorithm that determines whether to include a partial message body when downloading messages, which determination can be made dynamically prior to retrieving new messages upon each user request to download a new email.

At 102, a partial message size threshold, R, can be determined, which can be relative to and based at least in part on, a size of a typical message header. The partial message body size threshold, R, defines the boundary between small and large, relative to the size of the message header. R can be defined in an ad-hoc manner, and can be configurable via a registry key. At 104, a partial message size, P, can be determined, assigned, etc., that can be compared to the threshold, R, defined at 102. At 106, a determination can be made regarding whether the date of the email or message satisfies a date filter. For instance, if a date filter with a range of 7 days is utilized, then an email received within the last 7 days will satisfy the date filter while a more aged email will be excluded by the date filter. If the email message satisfies the date filter at 106, then the method can proceed to 110, where the header and a portion or all of the message body can be downloaded to the client (e.g., mobile device). If the date filter is not satisfied at 106, then at 108 a determination can be made regarding whether the size of the message portion, P, to be downloaded is less than the defined threshold, R. If it is determined that P<R, then the method can proceed to 110 where the header and the message portion can be downloaded and stored on the client device.

If, however, the message fails to satisfy the date filter at 106 and the message portion to be downloaded is larger than the threshold portion size as determined at 108, then at 112, only the header of the email message will be downloaded to the mobile device in order to save valuable memory space on the device and bandwidth associated with the download. The user can be permitted to request download of the message body or a portion thereof at 114, if the user deems the message important based on information provided in the header.

In accordance with performing the methodology 100, several observations can be taken into account. For example, message headers are typically of a known, constant size (e.g., 500 bytes, . . . ). If a user selects to store partial message bodies of a size that is small relative to the size of the header (e.g., 2-3 kilobytes, . . . ), then the extra cost of downloading the partial message is negligible. If the user selects to download and store entire message bodies or partial messages of a size that is large relative to the size of the header, then it can be desirable to download only the header of the message because the cost of downloading the header a second time in response to a user request (e.g., at 114) is negligible when compared to the cost of downloading the entire message unnecessarily. If the time since a last download request is less than the range of the date filter, then partial message bodies, regardless of their size (e.g., up to and including the entire message), should be downloaded with their respective headers because there exists a high probability that all new messages will be included by the date filter. Finally, if the time since a last download request is greater than the range of the date filter, then only the headers should be initially downloaded because there is a high probability that some messages will be downloaded unnecessarily.

The following discussion provides an example to illustrate the functionality of the methodology 100. According to the example, a date filter can be employed with a date rage of three days, and a partial download size, P, can be determined to be 2000 bytes. Additionally, header size can be estimated to be 500 bytes and a partial message download size threshold can be set to 3000 bytes. Throughout this example, messages on the server with future dates (e.g., dates later than the download date being described) have not actually been delivered as of the download date, but are present for purposes of clarity and continuity. Table 1 expresses various initial conditions for a set of messages according to the present example:

TABLE 1

| Message Date | Message Subject | Size | Header D/L? | On Device? | Savings |
|---|---|---|---|---|---|
| Jan. 1, 2000 | Very Old Message | 5000 | No | No | — |
| Dec. 25, 2004 | It's Christmas | 10000 | No | No | — |
| Dec. 31, 2004 | Almost New Years | 4000 | No | No | — |
| Jan. 1, 2005 | Testing #1 | 2000 | No | No | — |
| Jan. 2, 2005 | Testing #2 | 1000 | No | No | — |
| Jan. 2, 2005 | Testing #2.1 | 5000 | No | No | — |
| Jan. 3, 2005 | Testing #3 | 1500 | No | No | — |
| Jan. 3, 2005 | Testing #4 | 2500 | No | No | — |
| Jan. 3, 2005 | Testing #5 | 2000 | No | No | — |

To further this example, it can be determined that a first message download request is made on December 25. Because this is a first download, a last download date does not exist, so an assumption can be made that only headers should be downloaded, which results in a total savings of 1000 bytes because one of the messages is out of the filter range, as indicated in Table 2, below. As will be noted, 1500 bytes were saved on the first message because the device only downloaded the first 2000 bytes of a possible 5000.

TABLE 2

| Message Date | Message Subject | Size (bytes) | Header D/L? | On Device? | Savings (bytes) |
|---|---|---|---|---|---|
| Jan. 1, 2000 | Very Old Message | 5000 | Yes | No | 1500 |
| Dec. 25, 2004 | It's Christmas | 10000 | Yes | Yes | −500 |
| Dec. 31, 2004 | Almost New Years | 4000 | No | No | |
| Jan. 1, 2005 | Testing #1 | 2000 | No | No | |
| Jan. 2, 2005 | Testing #2 | 1000 | No | No | |
| Jan. 2, 2005 | Testing #2.1 | 5000 | No | No | |
| Jan. 3, 2005 | Testing #3 | 1500 | No | No | |
| Jan. 3, 2005 | Testing #4 | 2500 | No | No | |
| Jan. 3, 2005 | Testing #5 | 2000 | No | No | |

If a next download request occurs on Jan. 1, 2005, then the previous request occur 7 days prior to the present request, which exceeds the 3-day date filter range. Accordingly, headers can be downloaded before a message or portion thereof is downloaded, to determine whether individual messages satisfy the date filter. As illustrated in Table 3, a total of 1000 bytes worth of headers were downloaded twice (e.g., once to verify date filter compliance and again with the message portion upon date filter satisfaction). However, such duplicate header download is negligible in view of the considerable bandwidth and memory savings that can be achieved by requiring date filter compliance in a POP3 emailing environment.

TABLE 3

| Message Date | Message Subject | Size (bytes) | Header D/L? | On Device? | Waste (bytes) |
|---|---|---|---|---|---|
| Jan. 1, 2000 | Very Old Message | 5000 | — | No | |
| Dec. 25, 2004 | It's Christmas | 10000 | — | No | |
| Dec. 31, 2004 | Almost New Years | 4000 | Yes | No | 500 |
| Jan. 1, 2005 | Testing #1 | 2000 | Yes | No | 500 |
| Jan. 2, 2005 | Testing #2 | 1000 | No | No | |
| Jan. 2, 2005 | Testing #2.1 | 5000 | No | No | |
| Jan. 3, 2005 | Testing #3 | 1500 | No | No | |
| Jan. 3, 2005 | Testing #4 | 2500 | No | No | |
| Jan. 3, 2005 | Testing #5 | 2000 | No | No | |

Still referring to the example, a next download request can occur on Jan. 3, 2005, such that the time since the last download request is less than the range of the date filter. Thus, all messages delivered to the server since the January 1 download can be downloaded in the header-plus-partial message body format described with regard to the methodology 100, resulting in a net savings of 2500 bytes on the January 3 download, as illustrated below in Table 4.

TABLE 4

| Message Date | Message Subject | Size (bytes) | Header D/L? | On Device? | Waste (bytes) |
|---|---|---|---|---|---|
| Jan. 1, 2000 | Very Old Message | 5000 | — | No | |
| Dec. 25, 2004 | It's Christmas | 10000 | — | No | |
| Dec. 31, 2004 | Almost New Years | 4000 | — | No | |
| Jan. 1, 2005 | Testing #1 | 2000 | — | Yes | |
| Jan. 2, 2005 | Testing #2 | 1000 | No | Yes | 0 |
| Jan. 2, 2005 | Testing #2.1 | 5000 | No | Yes | 0 |
| Jan. 3, 2005 | Testing #3 | 1500 | No | Yes | 0 |
| Jan. 3, 2005 | Testing #4 | 2500 | No | Yes | 0 |
| Jan. 3, 2005 | Testing #5 | 2000 | No | Yes | 0 |

As can be seen from the preceding example, byte savings can be substantial, especially when the date range is set large enough to accommodate a user's email downloading habits. For instance, most email users check their email daily, so that a date range of three days is sufficient to ensure that a time period between downloads is within the date range. In this manner, unnecessary byte download waste can be mitigated such the 500-byte waste per email illustrated in Table 3 is not present in Table 4 because the 500 bytes were not downloaded. It is to be appreciated that the various date ranges, threshold values, etc., described herein are illustrative in nature and are not intended to be taken in a limiting sense.

According to another example, a user can configure settings to download a 5-kb partial message size, request 3 days worth of email, and synchronize to a server at day 7 since a last download. According to this example, it can be assumed for illustrative purposes that the user receives 5 email messages per day. Under a conventional system, upon synchronization, a client device will download 175 kb of data (e.g., 5 kb/message*7 days*5 messages/day). However, 4 of the 7 days of email will not be kept on the client device, resulting in download waste of 100 kb, while 75 kb are retained in the client device. In contrast, according to an aspect of the subject invention, under the same downloading conditions, the client device will download 82.5 kb (e.g., 5.5 kb per partial message with header*3 days of new mail*5 messages per day), of which 75 kb will be retained on the client device. Thus, according to his aspect, a net savings of 92.5 kb can be achieved.

FIG. 2 illustrates a methodology 200 for minimizing data transferred from a POP email server by employing a date filter to make a determination of whether to download a portion of an email message or only an email header to a client and permitting dynamic switching between download schemes upon detection of a boundary related to date filter inclusion. At 202, a partial message size threshold, R, can be determined and/or defined. The partial message body size threshold, R, delineates a boundary between small and large, relative to the size of the message header. At 204, a partial message size, P, can be determined, assigned, etc., for later comparison to the threshold, R, which was defined at 202. At 206, a determination can be made regarding whether the date of the email or message satisfies a date filter (e.g., is within a predefined date range, . . . ). If the email message is within the range of the date filter at 206, then at 210 the header and a portion or all of the message body can be downloaded to the client (e.g., mobile device, laptop, cellular phone, smartphone, PDA, PC, . . . ). If the date filter is not satisfied at 206, then at 208 a determination can be made regarding whether the size of the message portion, P, to be downloaded is less than the defined threshold, R. If it is determined that P<R, then the method can proceed to 210, where the header and the message portion can be downloaded and stored on the client device.

In the event that the message fails to satisfy the date filter at 206 and the message portion to be downloaded is larger than the threshold portion size as determined at 208, then at 212, only the header of the email message will be downloaded to the mobile device in order to mitigate unnecessary consumption of memory space on the device and/or bandwidth associated with download messages.

If, after initiation of a header-plus-message portion download at 210, it is determined by the client that a boundary related to message exclusion by the date filter has been or will soon be crossed (e.g., the current message is dated at or near an earliest date in the date filter range and messages are assessed in reverse-chronological order starting with a most recent, such that one or more successive messages will also likely be without the date filter range), then the client can dynamically switch from downloading the header and message portion to downloading only the header, at 216. If a user desires to download the entire message or a portion thereof, the user can be permitted to do so at 218. Similarly, if after initiation of a header-only download at 212, it is determined by the client that a boundary related to message exclusion by the date filter has been or will soon be crossed (e.g., the current message is dated at or near an earliest date in the date filter range and messages are assessed in chronological order starting with first delivered message after a last download, such that one or more successive messages will also likely be within the date filter range), then the client can dynamically switch from downloading only the header to downloading the header and a portion of the message body, at 214.

FIG. 3 illustrates a methodology 300 for mitigating bandwidth and/or memory consumption by a device when downloading email from a POP email server wherein a partial email message download size threshold is dynamically calculated based in part on an amount of time since a last download request. The method is similar to that described above with regard to FIG. 1. However, a major distinction from the method of FIG. 1 occurs with the dynamic determination of the threshold value, R, at 302. To calculate the value of R, a time since last download can be assessed. For instance, the longer the time period since a last download request, the higher the probability that messages exist that will be excluded by a date filter. Thus, a smaller value for R can be tolerated. Conversely, the more recently a last download request was made, the higher the probability for messages that will be included by the date filter, which in turn permits a tolerance for a relatively larger value for R.

For example, let E be an expected percentage of messages excluded by the date filter, let H be header size (a constant), and let P be partial message size (e.g., configurable by a user). Waste, w, generated by the respective downloading methods can be described as:

$$w_p(n)=E*P*n; \text{ and}$$

$$w_h(n)=(1-E)*H*n$$

where n is a number of messages downloaded, $w_p$ is expected waste generated by downloading partial message bodies with message headers, and $w_h$ is expected waste generated by downloading headers only and potentially re-downloading the a header with its respective message.

Given the preceding expressions, a partial message size that will result in substantially equal amounts of waste for each method can be derived such that:

$$P=H/E-H; \text{ and}$$

$$R=H/E-H$$

Given the above, a boundary can be determined that can facilitate selecting one method of download over the other. Since H is typically a constant value (or dynamically adjusted by the client after a substantial number of download requests), the threshold value R can be calculated given a reasonable value for E. For instance, let T be the time since last download request, and let D be the date range used by the date filter. The E can be calculated such that:

$$E=0, \text{ when } T<D; \text{ and}$$

$$E=(1-D/T), \text{ when } T>=D$$

Thus, as E approaches 0, indicating that no messages are expected to be excluded by the date filter, the value of R can approach infinity because $w_p(n)=0$. Conversely, if T is much greater than D, then very little waste will be generated by downloading headers only on an initial download because $w_h(n)$ approaches 0 when E approaches 1.

Once a value for R has been determined using the optimization technique at 302, a partial message size, P, can be identified at 304. At 306, a determination can be made regarding whether the date of the email or message satisfies the date filter range. Upon inclusion by the date filter at 306, the method can proceed to 310, where the header and a portion or all of the message body can be downloaded to the client device. If the date filter range requirement is not satisfied at 306, then at 308 a determination can be made regarding whether the size of the message portion, P, to be downloaded is less than the dynamically determined threshold, R. If it is determined that P<R, then the method can proceed to 310 where the header and the message portion can be downloaded and stored on the client device.

If the message portion to be downloaded is larger than the threshold portion size as determined at 308, then at 312, only the header of the email message is downloaded to the mobile device, which conserves valuable memory space on the device and bandwidth associated with the download. A user can request download of the message body or a portion thereof at 314, if the user wishes to download and/or view the message body based on information provided in the downloaded header.

Figure 4:
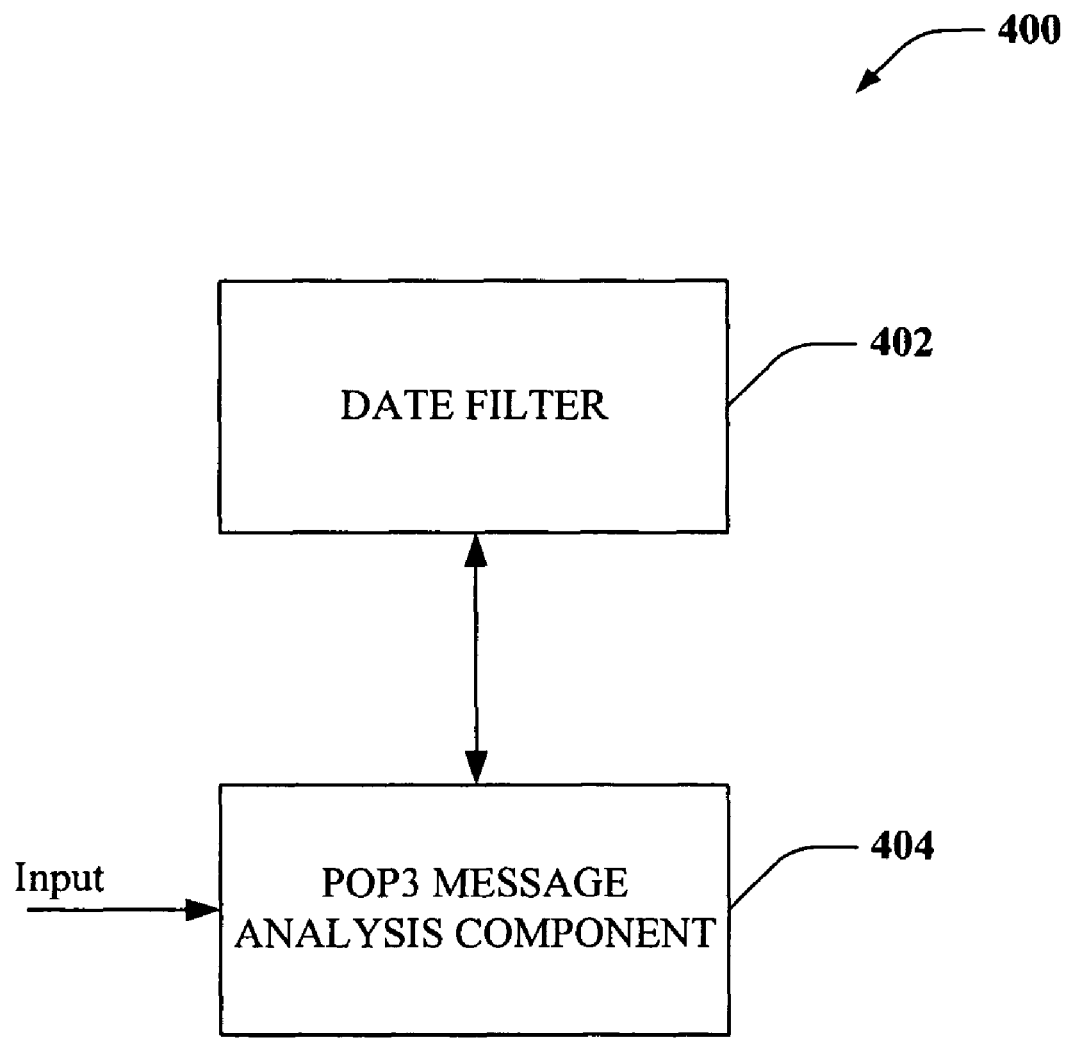
FIG. 4 illustrates a system that facilitates mitigating bandwidth and memory requirements associated with downloading email messages from an email server.

Now turning to FIG. 4, a system 400 is illustrated that facilitates mitigating bandwidth and memory requirements associated with downloading email messages from an email server, such as a POP server. The system 400 comprises a date filter 402 that is operatively coupled to a message analysis component 404. The analysis component 404 can receive input related to one or more emails to be downloaded and can determine an appropriate portion of the email to download to permit based at least in part on a delivery date of an email and a date range provided by the date filter 402. In this manner, the system 400 can mitigate unnecessary download and/or storage of email that is ultimately discarded. The analysis component 404 can employ an algorithm to determine the size of an email or a portion thereof relative to the size of the email header to facilitate predicting whether downloading only the header for the email or the header and a portion of the email is likely to be more efficient in mitigating waste associated with unnecessary email downloads.

For example, upon downloading an email from a server (not shown), the analysis component can determine whether it is more efficient to download the email header only, the email header and part of the message body, and/or the header and the entire message body. Such downloading options additionally can correspond to storing email data in one of three manners. When date filter 402 is employed and more than a message header is to be downloaded and stored, there exists potential for system resources to be wasted during download because the message can ultimately be excluded by the date filter 402 (e.g., if the date of the message is not within the range of the date filter 402). Downloading a message prior to subjecting the message to the date filter 402 risks occupying system resources that need not be occupied. For instance, download of a header and a portion of a message body associated therewith, followed by exclusion of the message by the date filter 402, can result in wasted resources being occupied to download and store the portion of the message body when only the header was required to determine whether the message should be excluded.

Figure 5:
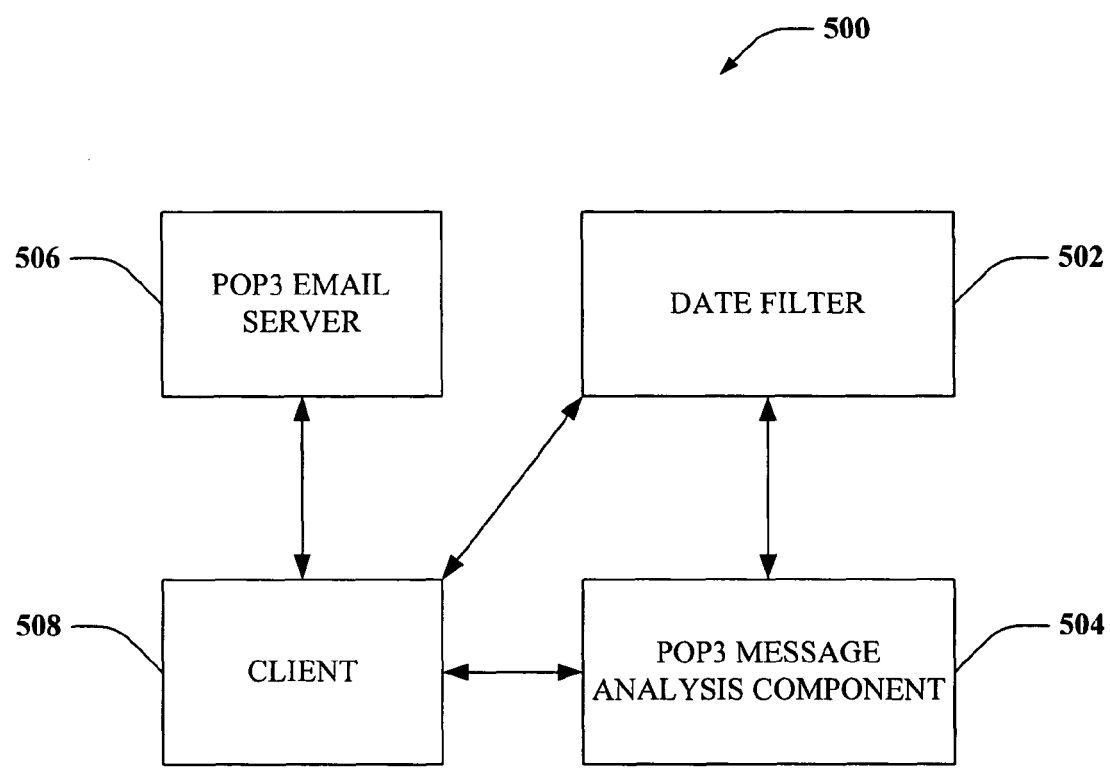
FIG. 5 is an illustration of a system that facilitates mitigating resource waste when downloading emails from a POP server to a client device.

FIG. 5 is an illustration of system 500 that facilitates mitigating resource waste when downloading emails from a POP server to a client device. The system 500 comprises a date filter 502 that is operatively coupled to a POP message analysis component 504. The analysis component 504 is further operatively associated with a client device 508. It will be appreciated that, although depicted as separate components, either or both of the analysis component 504 and the date filter 502 can be integral to the client device 508. The client device 508 is further operatively associated with a POP3 message server 506 from which the client device 508 can retrieve email messages.

When a user of the client device 508 initiates a download request to check email from the server 506, the analysis component 504 can facilitate making a determination of a most efficient method of retrieving such email. For example, the analysis component 504 can compare a date in the header of an email to a date range associated with the date filter 502. If the analysis component 504 determines that the date of the email is within the date range of the date filter 502, then the email header can be downloaded as well as a portion of the email body. If the email header indicates that the email message does not satisfy the date filter 502, then the analysis component 504 can compare the size of the message body to a predetermined message size threshold, which can be a function of header size, and can determine whether to download the header only, or the header and the message portion, to the client device 508. Such a determination can be made, for example, by employing the algorithm set forth supra with regard to FIG. 1.

Figure 6:
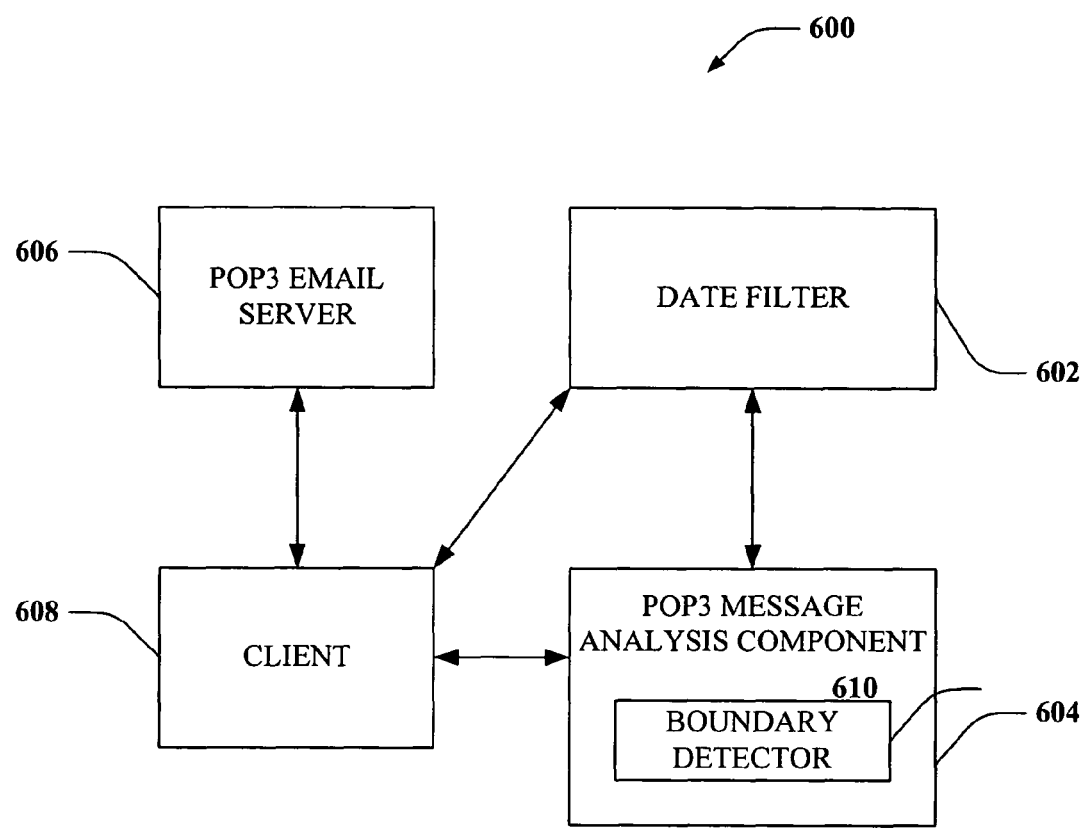
FIG. 6 illustrates a system that facilitates determining an appropriate method of message download to mitigate unnecessary consumption of resources during message download and/or storage.

FIG. 6 illustrates a system 600 that facilitates determining an appropriate method of message download to mitigate unnecessary consumption of resources during message download and/or storage. The system 600 comprises a date filter 602 with a predefined date range against which a date associated with an email to be downloaded from a POP3 server 606 to a client 608 can be compared to determine whether the message should be downloaded. The system 600 further comprises a message analysis component 604 that determines whether a message body, a portion thereof, or only a header for the message should be downloaded to minimize an amount of data transferred between the POP3 server 606 and the client device 608, as described above with regard to the preceding figures.

The analysis component 604 comprises a boundary detector 610 that can facilitate a determination by the analysis component 604 whether the system 600 should switch from downloading a header only for an email message to a header-plus-partial message or vice-versa. For example, after initiation of a header-plus-message portion download for a particular email (e.g., based on date filter satisfaction and/or sub-threshold partial message size), the boundary detector component 610 can determine a boundary related to message exclusion by the date filter 602 has been or will soon be crossed (e.g., the current message has a date at or near an earliest date in the date filter range and messages are assessed in reverse-chronological order starting with a most recent, such that one or more successive messages will likely be without the date filter range), then the client 608 can dynamically switch from downloading the header and message portion to downloading only the header. Similarly, if after initiation of a header-only download, it is determined by the boundary detector 610 that a boundary related to message exclusion by the date filter 602 has been or will soon be crossed (e.g., the current message is dated at or near an earliest date in the date filter range and messages are assessed in chronological order starting with first delivered message after a last download request, such that one or more successive messages will also likely be within the date filter range), then the client 608 can dynamically switch from downloading the header only to downloading the header and message portion.

Figure 7:
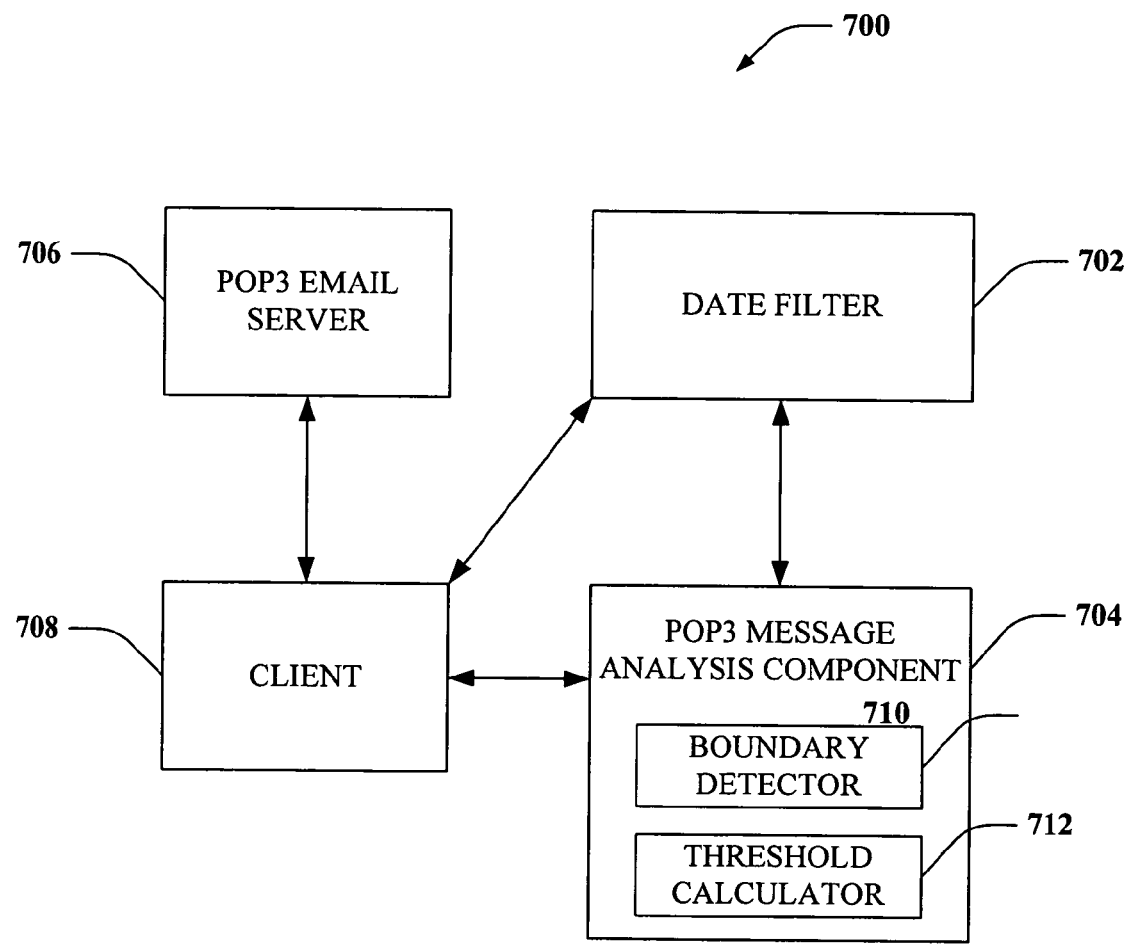
FIG. 7 is an illustration of a system that facilitates mitigating bandwidth requirements for email downloads from a POP server to a client device and dynamically determining a threshold message portion size.

FIG. 7 is an illustration of a system 700 that facilitates mitigating bandwidth requirements for email downloads from a POP3 server to a client device and dynamically determining a threshold message portion size. The system 700 comprises a date filter 702 and a message analysis component 704, each of which is operatively coupled to a client device 708 and to each other. The client device 708 is furthermore coupled to a message server 706 that retains email messages for a user until the user employs the client device to download such email messages. The analysis component 704 comprises a boundary detection component 710 as detailed above with regard to FIG. 6, as well as a threshold calculation component 712 that facilitates dynamically determining a threshold size, R, for a portion of an email to be downloaded with an email header to minimize waste of system resources such as bandwidth and/or memory.

For example, the threshold component 712 can determine $w_p$ and $w_h$, as detailed above with regard to FIG. 3. Once a value for R has been determined by the threshold calculation component 712, a partial message size, P, for a given message can be determined by the analysis component 704 based on information contained in the header for the message. Once the date filter 702 has determined whether the date of the email or message satisfies the date filter range, the message can be added to a list of messages to be wholly or partially downloaded to the client 708. If the date filter range requirement is not satisfied, then the analysis component 704 can determine whether the size of the message portion, P, to be downloaded is less than the dynamically determined threshold, R. If it is determined that P<R, then the header and the message portion can be downloaded from the server 706 and stored on the client device 708. If the message portion to be downloaded is larger than the threshold portion size, then only the header of the email message will be downloaded to the client device 708, in order to conserve system resources. If the user wishes to download and/or view the message body based on information provided in the downloaded header, the user can be permitted to initiate a download of the message body via the client device 708.

Figure 8:
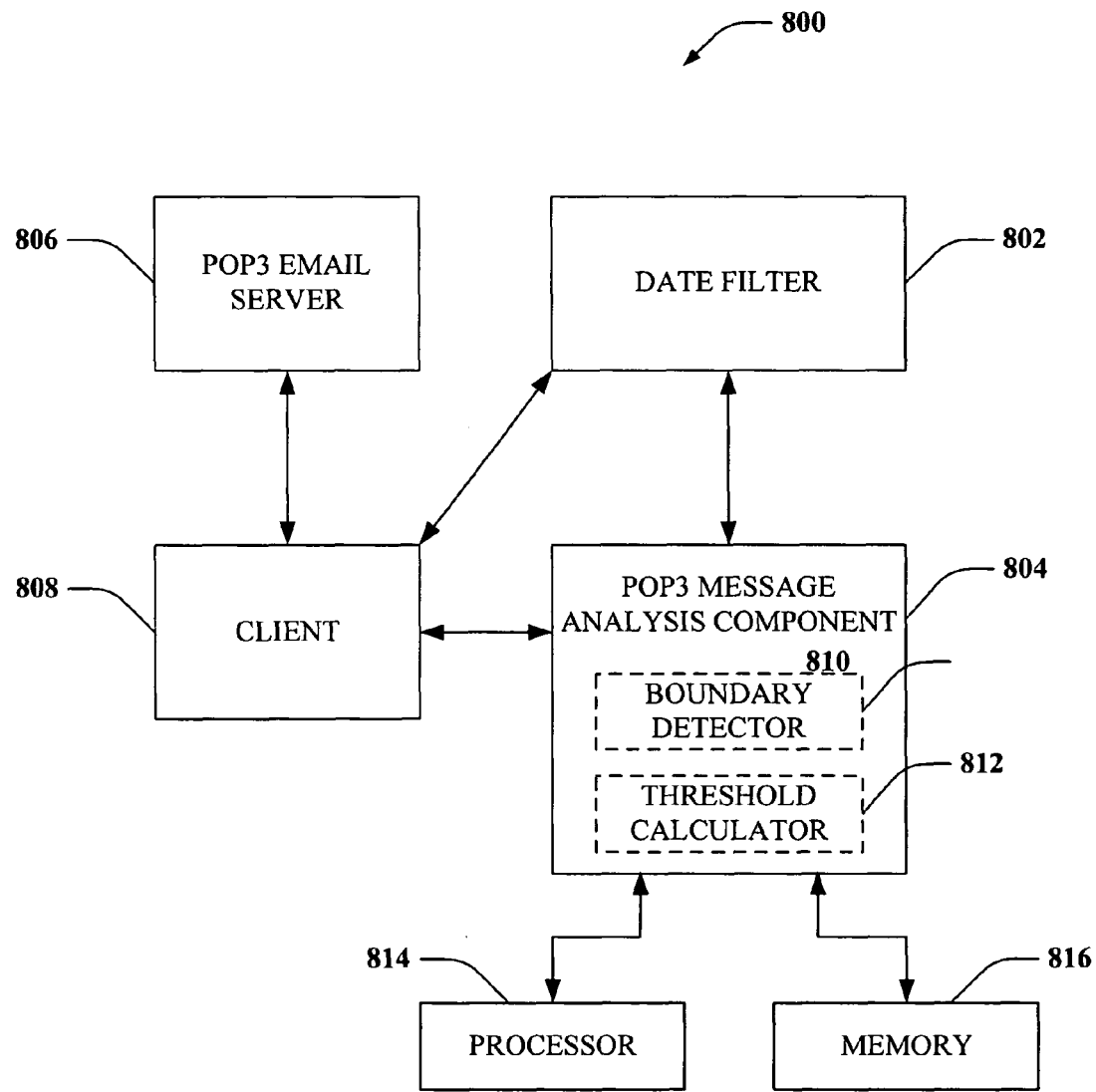
FIG. 8 illustrates a system that facilitates data transfer minimization during message retrieval from a POP message server.

FIG. 8 illustrates a system 800 that facilitates data transfer minimization during message retrieval from a POP3 message server. The system 800 comprises a date filter 802 and a POP3 message analysis component 804 that respectively determine whether a message is recent enough and/or comprises a portion to be downloaded that is small enough to warrant downloading of the header and message portion rather than just the header. The system 800 also comprises a POP3 email server 806 that retains email messages for a client 808 until a user employs the client 808 to retrieve such messages from the server 806. The client 808 is operatively coupled to each of the date filter 802 and the message analysis component 804, which in turn comprises a boundary detection component 801 and a threshold calculation component 812 as detailed with regard to the preceding figures.

The system 800 further comprises a processor 814 and a memory 816. It is to be appreciated that the processor 814 can be a processor dedicated to analyzing and/or generating information received by the message analysis component 804 and/or components thereof, a processor that controls one or more components of the system 800, and/or a processor that both analyzes and generates information received by the message analysis component 804 and/or components thereof and controls one or more components of the system 800.

The memory 816 can additionally store protocols associated with downloading a message header, a message header with a portion of the message body, and/or a header and an entire corresponding message body, protocols associated with determining an optimal threshold message size below which a message body portion may be downloaded, etc., as described herein. It will be appreciated that the memory 816 component can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 816 of the subject systems and methods is intended to comprise, without being limited to, these and any other suitable types of memory.

Figure 9:
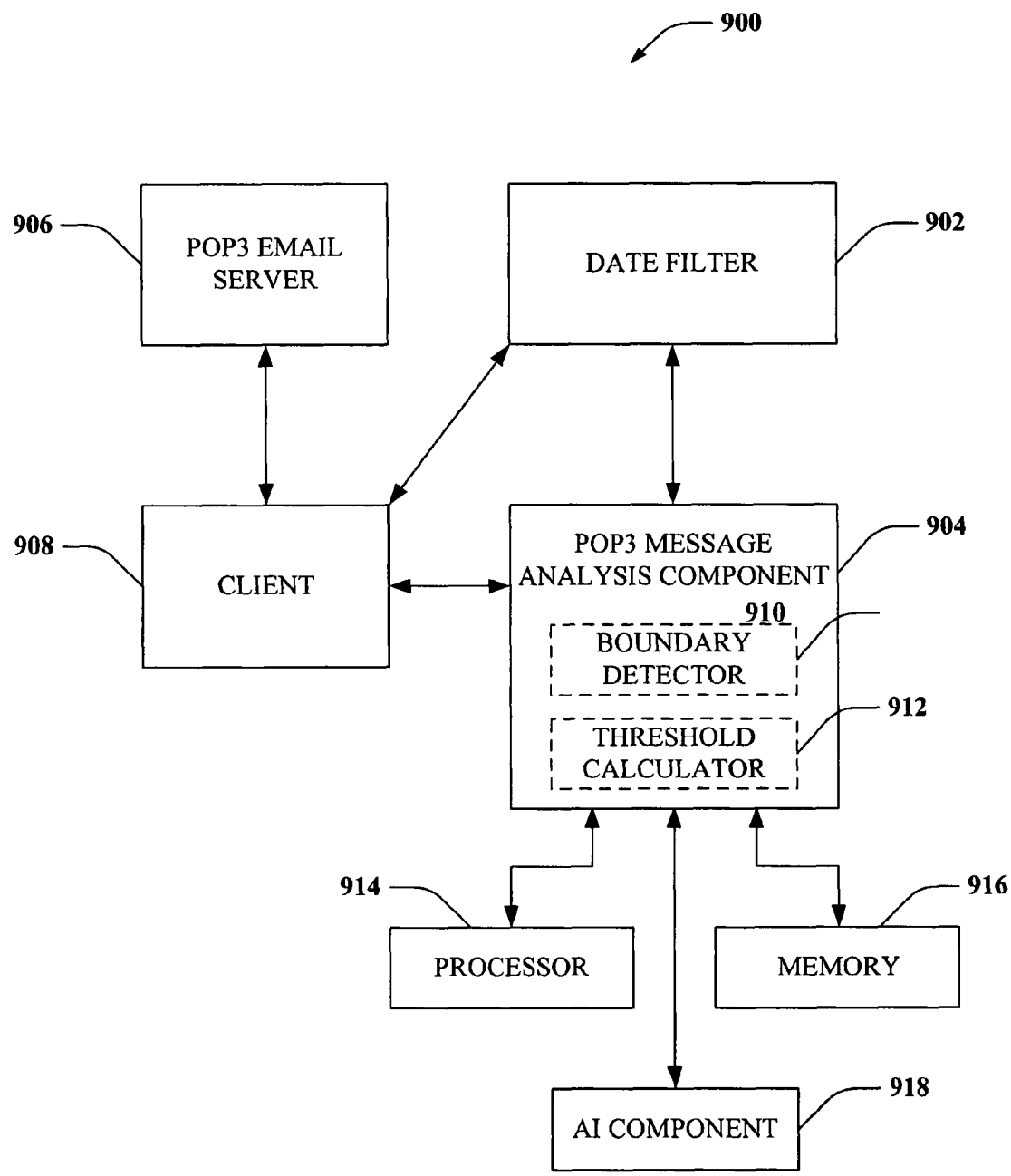
FIG. 9 is an illustration of a system that facilitates improving data transfer efficiency between a POP message server and a client device by making inferences regarding a most suitable method of mitigating resource waste.

FIG. 9 is an illustration of a system 900 that facilitates improving data transfer efficiency between a POP3 message server and a client device by making inferences regarding a most suitable method of mitigating resource waste. The system 900 comprises a date filter 902 that determines whether a message to be downloaded is within a predefined date range to assess whether to download the header of the message with the message body or a portion thereof, or whether to download the header only (e.g., if the message is outside of the predefined date range). The date filter 902 is coupled to a POP3 message analysis component 904 that determines the size of a message header in bytes, and assesses the size of an associated message body. The analysis component 904 can predefine a message body size threshold based at least in part on the size of the header, beyond which only message headers will be downloaded to conserve system resources. For example, if the analysis component 904 determines that a header size is 500 bytes in size, a predefined message size threshold can be set at 2000 bytes. For messages excluded by the date filter 902 for being too aged to warrant download of more than just a message header, the analysis component 904 can still permit download of the header and a message body portion from a POP3 server 906 to a client 908 when the message body portion to be downloaded is below the 2000-byte threshold.

The analysis component 904 comprises a boundary detector 910 that permits the system 900 to dynamically switch between a header-only download protocol and a header-plus-partial message download protocol upon determining that a substantial number of upcoming messages will likely be included or excluded by the date filter 902. The analysis component 904 further comprises a threshold calculator component 912 that facilitates dynamically determining an appropriate message portion size threshold based on predicted resource waste analysis, which can be implemented alternatively and/or in addition to the predefined message size threshold described above. Furthermore, the analysis component 904 is operatively coupled to each of a processor 914 and a memory 916.

The system 900 further comprises an artificial intelligence (AI) component 918 that can make inferences regarding system operation. For example, the AI component 918 can receive information related to a particular type of attachment or embedded object in an email message to be downloaded and can infer that a message comprising such data should be downloaded using a header-only method due to the anticipated size of the message body (e.g., without assessing message size), etc. According to a related example, the AI component 918 can operate in conjunction with the boundary detector 910 to infer a proper time for switching between downloading methods, and/or with the threshold calculation component 912 to determine an appropriate message size threshold. It will be appreciated that the foregoing examples are illustrative in nature, and are not intended to limit the scope or number of inferences that can be made or the manner in which the AI component 918 makes inferences.

The AI component 918 (e.g., in connection with minimizing data transfer) can employ various artificial intelligence based schemes for carrying out various aspects thereof. For example, a process for determining which download method preserves system resources most efficiently can be facilitated via an automatic classifier system and process.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. In the case of email messaging systems, for example, attributes can be messages, headers, message body size, or other data-specific attributes derived from the messages, headers, etc. (e.g., dates, byte-size, . . . ), and the classes are categories or areas of interest (e.g., system resource waste, . . . ).

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically perform a number of functions, including but not limited to determining according to a predetermined criteria whether to download a message header only or a message header and a portion of the message body, when to switch between download methods, whether a determined message body size threshold is optimal based on resource waste predictions, etc.

Figure 10:
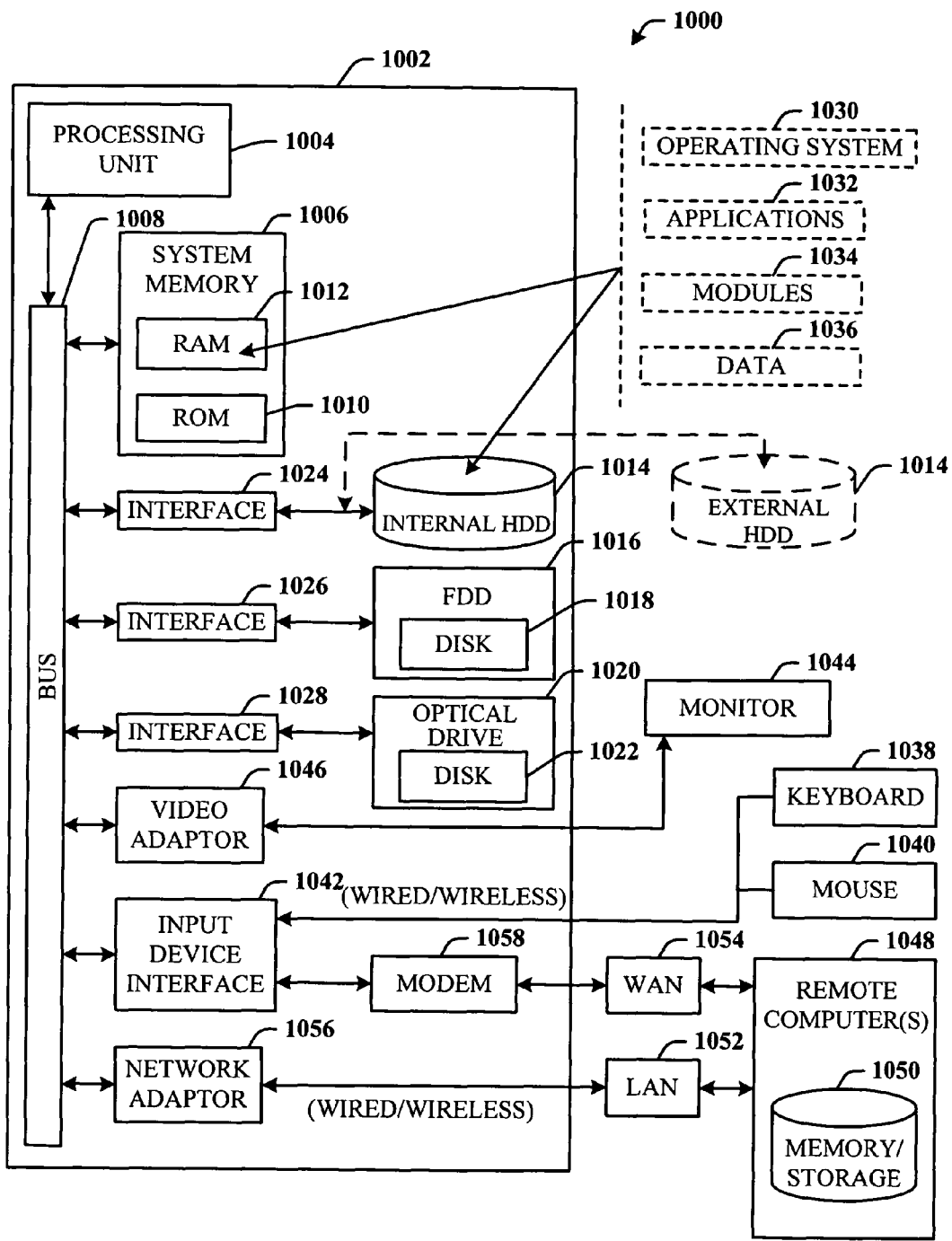
FIG. 10 illustrates a block diagram of a computer operable to execute the disclosed architecture.

Referring now to FIG. 10, there is illustrated a block diagram of a computer operable to execute the disclosed architecture. In order to provide additional context for various aspects of the subject invention, FIG. 10 and the following discussion are intended to provide a brief, general description of a suitable computing environment 1000 in which the various aspects of the subject invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 10, there is illustrated an exemplary environment 1000 for implementing various aspects of the invention that includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the subject invention.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the subject invention can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices, and companies, and facilitate enterprise-wide computer networks, such as intranets, all of which may connect to a global communication network, e.g., the Internet.

When used in a LAN networking environment, the computer 1002 is connected to the local network 1052 through a wired and/or wireless communication network interface or adapter 1056. The adaptor 1056 may facilitate wired or wireless communication to the LAN 1052, which may also include a wireless access point disposed thereon for communicating with the wireless adaptor 1056. When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with conventional network or simply an ad hoc communication between at least two devices.

Wi-Fi, or Wireless Fidelity, allows connection to the Internet from a couch at home, a bed in a hotel room or a conference room at work, without wires. Wi-Fi is a wireless technology like a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 11:
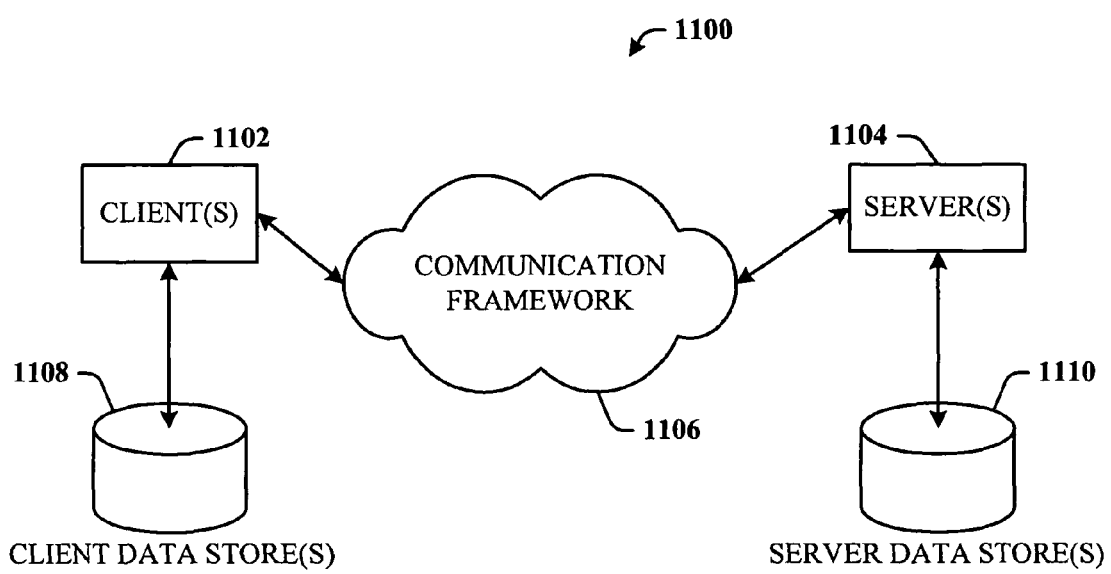
FIG. 11 illustrates a schematic block diagram of an exemplary computing environment in accordance with the subject invention.

Referring now to FIG. 11, there is illustrated a schematic block diagram of an exemplary computing environment 1100 in accordance with the subject invention. The system 1100 includes one or more client(s) 1102. The client(s) 1102 can be hardware and/or software (e.g., threads, processes, computing devices). The client(s) 1102 can house cookie(s) and/or associated contextual information by employing the subject invention, for example. The system 1100 also includes one or more server(s) 1104. The server(s) 1104 can also be hardware and/or software (e.g., threads, processes, computing devices). The servers 1104 can house threads to perform transformations by employing the subject invention, for example. One possible communication between a client 1102 and a server 1104 can be in the form of a data packet adapted to be transmitted between two or more computer processes. The data packet may include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of mitigating bandwidth and memory consumption by a user device when retrieving email via a post office protocol when a time (T) since a last download request is greater than a predetermined threshold time (D), comprising:
    employing a processor to execute computer executable instructions stored in memory to perform the following acts:
        identifying a user request to download at least a portion of an email message, the at least a portion of the email message including a header for the message and at least a portion of a body for the message;
        determining, from an analysis of the message header, whether the message is received at a message server more recently than D;
        determining whether the message body portion is less than a threshold body size (R) derived from a size of the message header (H) using a formula R=H/E−H, wherein E is an expected percentage of messages excluded by D, wherein E=(1−D/T), and wherein E approaches zero as T decreases to approach D;
        if the message is received at the message server more recently than the predetermined threshold time or the message body portion is less than the threshold body size relative to the size of the message header, downloading the at least a portion of the email message to the user device; and
        if the message is not received at the message server more recently than the predetermined threshold time and the message body portion is not less than the threshold body size derived from the size of the message header:
            downloading the header to the user device in a first download; and
            upon user request, downloading the message body to the user device in a second download.

2. The method of claim 1, further comprising downloading the at least a portion of the email message to the user device when the message body portion is smaller than the threshold body size.

3. The method of claim 1, further comprising precluding the downloading of the header or the message body to the user device when the message is less recent than the predetermined threshold time and the message body portion is larger than the threshold body size.

4. The method of claim 3, further comprising permitting a user to request download of the message body associated with the downloaded message header.

5. The method of claim 1, the threshold body size is predetermined based at least in part on an estimate of the size of the message header.

6. The method of claim 1, further comprising dynamically determining the threshold body size based on a time period since a last download request.

7. The method of claim 6, the act of dynamically determining the threshold body size comprises:
    determining an amount of wasted bytes, for each of a header-only download protocol and a header-plus-partial message download protocol; and
    solving for a partial message size wherein the wasted bytes generated by each protocol is equivalent.

8. The method of claim 7, further comprising determining a boundary that delineates a point at which one protocol becomes more efficient than the other.

9. A non-transitory computer-readable storage medium for mitigating bandwidth and memory consumption by a user device when retrieving email via a post office protocol when a time (T) since a last download request is greater than a predetermined threshold time (D) having stored thereon computer-executable instructions for:
identifying a user request to download at least a portion of an email message, the at least a portion of the email message including a header for the message and at least a portion of a body for the message;
determining, from an analysis of the message header, whether the message is received at a message server more recently than D;
determining whether the message body portion is less than a threshold body size (R) derived from a size of the message header (H) using a formula R=H/E−H, wherein E is an expected percentage of messages excluded by D, wherein E−(1−D/T), and wherein E approaches zero as T decreases to approach D;
if the message is received at the message server more recently than the predetermined threshold time or the message body portion is less than the threshold body size relative to the size of the message header, downloading the at least a portion of the email message to the user device; and
if the message is not received at the message server more recently than the predetermined threshold time and the message body portion is not less than the threshold body size derived from the size of the message header:
downloading the header to the user device in a first download; and
upon user request, downloading the message body to the user device in a second download.

10. A data transfer minimization system executing on one or more processors that facilitates mitigating resource consumption during message download from a message server when a time (T) since a last download request is greater than a predefined date range (D), comprising:
a date filter that determines, from a message header, whether a message corresponding to the message header is within D to permit the message to be analyzed; and
a message analysis component that:
determines whether a message body portion associated with the message header is less than a threshold body size (R) derived from a size of the message header (H) using a formula R=H/E−H, wherein E is an expected percentage of messages excluded by D, wherein E=(1−D/T), and wherein E approaches zero as T decreases to approach D;
downloads at least a portion of the email message to a user device if the message is within the predefined date range or the message body portion is less than the threshold body size derived from the size of the message header; and
if the message is not within the predefined date range and the message body portion is not less than the threshold body size relative to the size of the message header:
downloads the header to the user device in a first download; and
downloads, upon user request, the message body to the user device in a second download.

11. The system of claim 10, wherein the message server is a post office protocol server.

12. The system of claim 10, further comprising a client device that downloads the message header and message body if the message is within the predefined date range or has a message body size below the threshold body size.

13. The system of claim 10, further comprising a threshold calculation component that dynamically determines an optimal threshold body size for message bodies based at least in part on a time period since a last download request by a client.

14. The system of claim 10, wherein the threshold body size is predetermined and configurable by a user.

15. The system of claim 10, further comprising a boundary detection component that determines a point at which one of a header-only download protocol and a header-plus—partial message download protocol becomes more efficient than the other.

16. The system of claim 15, wherein efficiency is assessed based at least in part on a number of wasted bytes.

17. A system executing on one or more processors that facilitates minimizing data transfer from a post office protocol server to a client when a time (T) since a last download request is greater than a predetermined threshold time (D), comprising:
means for identifying a user request to download at least a portion of an email message, the at least a portion of the email message including a header for the message and at least a portion of a body for the message;
means for determining a size of the message header;
means for determining a threshold message body size;
means for applying a date filter to determine whether the message is more recent than D;
means for determining whether the message body portion is less than a threshold body size (R) derived from a size of the message header (H) using a formula R=H/E−H, wherein E is an expected percentage of messages excluded by D, wherein E−(1−D/T), and wherein E approaches zero as T decreases to approach D;
means for downloading the at least a portion of the email message to the user device if the message is more recent than the predetermined threshold or the message body portion is less than the threshold body size relative to the size of the message header;
means for downloading the header to the user device in a first download and downloading, upon user request, the message body to the user device in a second download if the message is not more recent than the predetermined threshold and the message body portion is not less than the threshold body size derived from the size of the message header;
means for precluding the downloading of the header or the message body to the user device when the message is less recent than the predetermined threshold time and the message body portion is larger than the threshold body size;
means for permitting a user to request download of the message body associated with the downloaded message header; and
means for dynamically determining the threshold body size based on a time period since a last download request.

* * * * *

UNITED STATES PATENT AND TRADEMARK OFFICE
CERTIFICATE OF CORRECTION

PATENT NO. : 7,882,181 B2
APPLICATION NO. : 11/144872
DATED : February 1, 2011
INVENTOR(S) : Paul K. Kromann et al.

Page 1 of 1

It is certified that error appears in the above-identified patent and that said Letters Patent is hereby corrected as shown below:

In Face page, in field (75), under "Inventors" column 1, line 1, delete "Kroman" and insert -- Kromann --, therefor.

In column 20, line 38, in Claim 17, delete "E-(1-D/T)" and insert -- E=(1-D/T) --, therefor.

Signed and Sealed this
Nineteenth Day of July, 2011

David J. Kappos
*Director of the United States Patent and Trademark Office*